(No Model.)
R. S. & J. W. McCALL.
BICYCLE.
No. 280,054. Patented June 26, 1883.
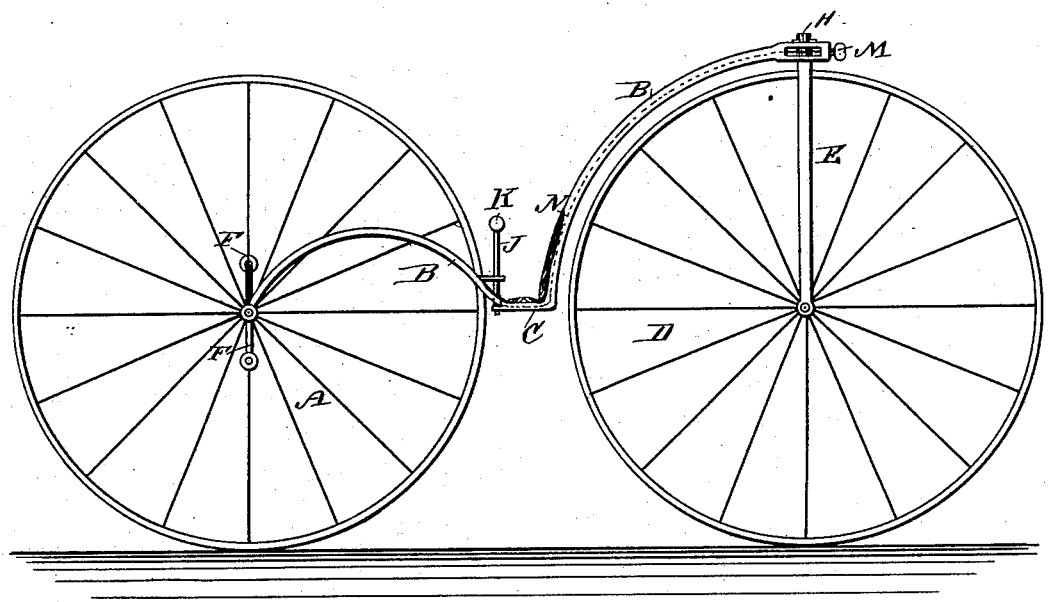
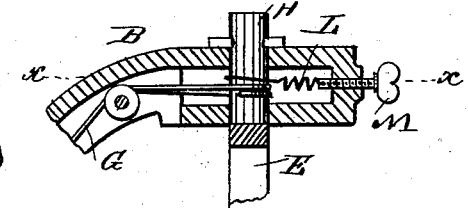
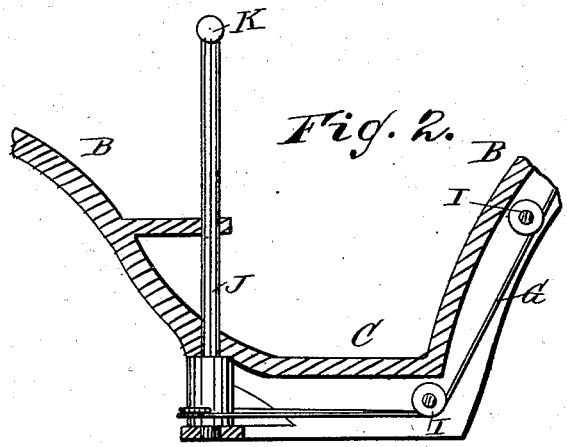
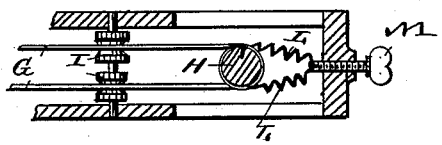
WITNESSES:
Theo. G. Hoster
C. Sedgwick
INVENTOR:
J. W. McCall
R. S. McCall
BY Munn & Co
ATTORNEYS.

UNITED STATES PATENT OFFICE.

ROBERT S. McCALL AND JOSEPH W. McCALL, OF KANSAS CITY, MISSOURI.

BICYCLE.

SPECIFICATION forming part of Letters Patent No. 280,054, dated June 26, 1883.

Application filed April 7, 1883. (No model.)

*To all whom it may concern:*

Be it known that we, ROBERT S. McCALL and JOSEPH W. McCALL, of Kansas City, in the county of Jackson and State of Missouri, have invented a new and Improved Bicycle, of which the following is a full, clear, and exact description.

The object of our invention is to provide a new and improved bicycle, which is so constructed that the center of gravity is very low, and the vehicle will not be apt to tilt. It can be mounted easily, and the rider is not liable to be thrown over the front wheel when the same strikes against obstructions.

The invention consists in a bicycle constructed with a reach having a depression for the seat between the front and rear wheels, and with springs secured to the pivot of the fork in which the rear wheel is journaled, for the purpose of holding the rear or steering wheel in line with the front or driving wheel. The fork is turned by means of wires or cords secured to the pivot of the same, and to a vertical steering-shaft in front of the seat, which wires or cords pass through a longitudinal recess in the bottom of the reach.

Reference is to be had to the accompanying drawings, forming part of this specification, in which similar letters of reference indicate corresponding parts in all the figures.

Figure 1 is a longitudinal elevation of our improved bicycle. Fig. 2 is a detail enlarged longitudinal sectional elevation of the middle of the reach. Fig. 3 is a detail enlarged longitudinal sectional elevation of the rear end of the reach. Fig. 4 is a sectional plan view of the same on the line $x\,x$, Fig. 3.

The front wheel, A, is journaled in the front forked end of a curved reach, B, which is provided with a depressed part, C, between the front wheel, A, and the rear wheel, D, which is journaled in a vertical fork, E, having its upper end pivoted in the rear end of the reach B. The front wheel, A, is provided with cranks F, for operating it. The seat rests on the depressed middle part, C, of the reach. Two wires or cords, G, are wound around the pivot H at the upper part of the fork E, in opposite directions, and from there pass over pulleys I within a longitudinal recess formed in the bottom of the reach B, to a vertical shaft, J, journaled in the reach in front of the seat, and provided at the upper end with a cross-bar or handle, K. The wires or cords G are attached to the lower end of the shaft J and wound around the same in opposite directions. Two springs, L, are attached to the pivot H at diametrically-opposite points, and have their free ends attached to the inner end of an adjusting-screw, M, in the rear end of the reach. The springs L always bring the rear wheel, D, in a position in line with the front wheel when the steering-shaft J is released. A back-rest, N, is attached to the rear curved part of the reach B.

The vehicle can easily be steered by moving the handle K of the shaft J a very short distance.

The center of gravity of the bicycle is very low, and thus the danger of tilting is avoided considerably.

The bicycle can be mounted very easily, and as the rider sits very low there is not much danger of his being thrown over the front wheel in case the same strikes against an obstruction.

The bicycle can run forward or backward. When the steering-shaft J is released, the rear wheel is adjusted automatically by the springs L in such a manner that the vehicle runs straight forward or backward.

Having thus described our invention, we claim as new and desire to secure by Letters Patent—

1. In a velocipede, the reach B, with its central portion arranged in a depressed position and adapted to form a seat, C, and its rear portion provided with a back-rest, N, substantially as and for the purpose set forth.

2. In a bicycle, the combination, with the reach B and the wheels A D, of the fork E, the wires G, the shaft J, the springs L, and the adjusting-screw M, substantially as herein shown and described, and for the purpose set forth.

3. In a bicycle, the combination, with the reach B, provided with a recess on its under side, and the wheels A D, of the fork E, the shaft J, the wires or cords G, the pulleys I, the springs L, and the adjusting-screw M, substantially as herein shown and described, and for the purpose set forth.

ROBERT S. McCALL.
JOSEPH W. McCALL.

Witnesses:
FRANCIS X. TEASDALE,
WM. A. HAMSBERGER.